April 20, 1965  J. I. CARLSON, SR., ET AL  3,179,262
MATERIAL TRANSFERRING APPARATUS
Filed May 21, 1963  5 Sheets-Sheet 1
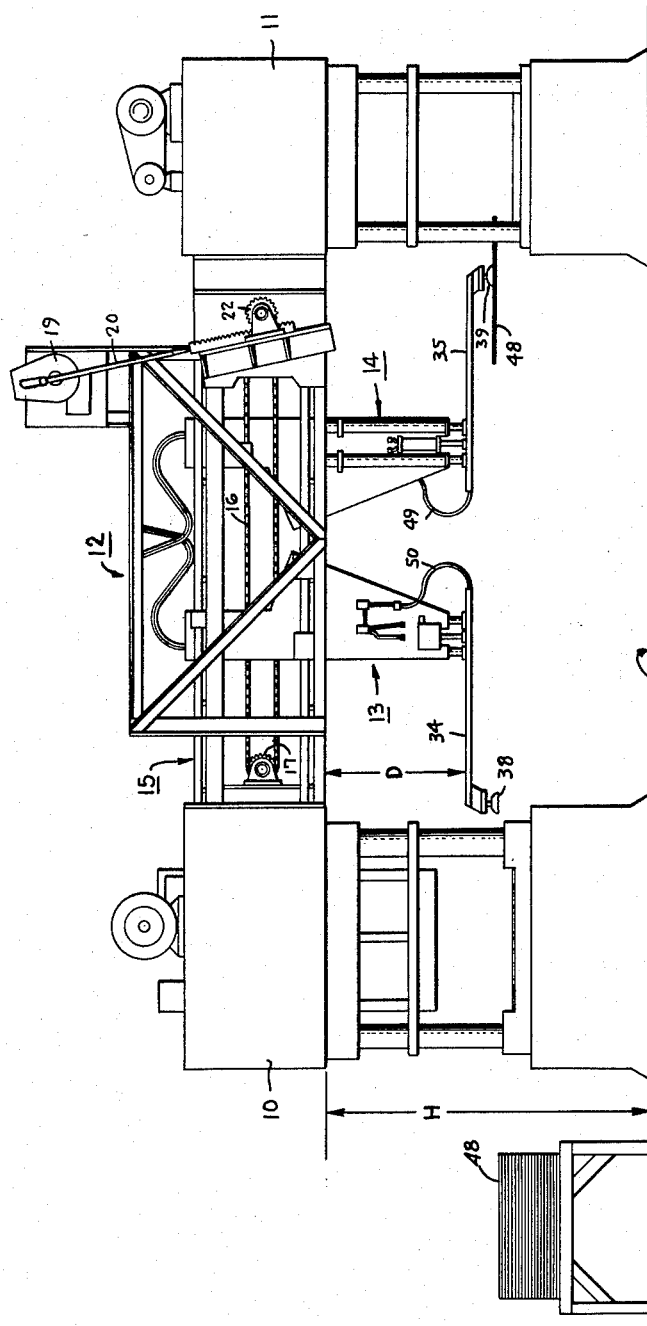
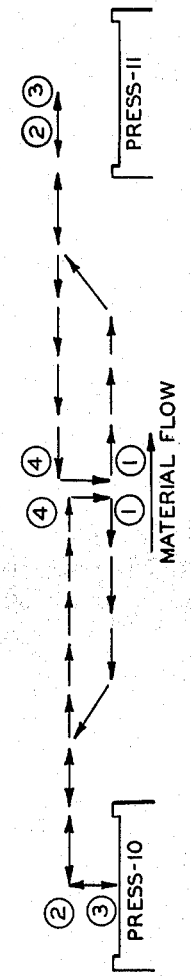
INVENTORS
JOHN I. CARLSON, SR.,
CHARLES P. PAGE
BY
Robert F. Casey
ATTORNEY

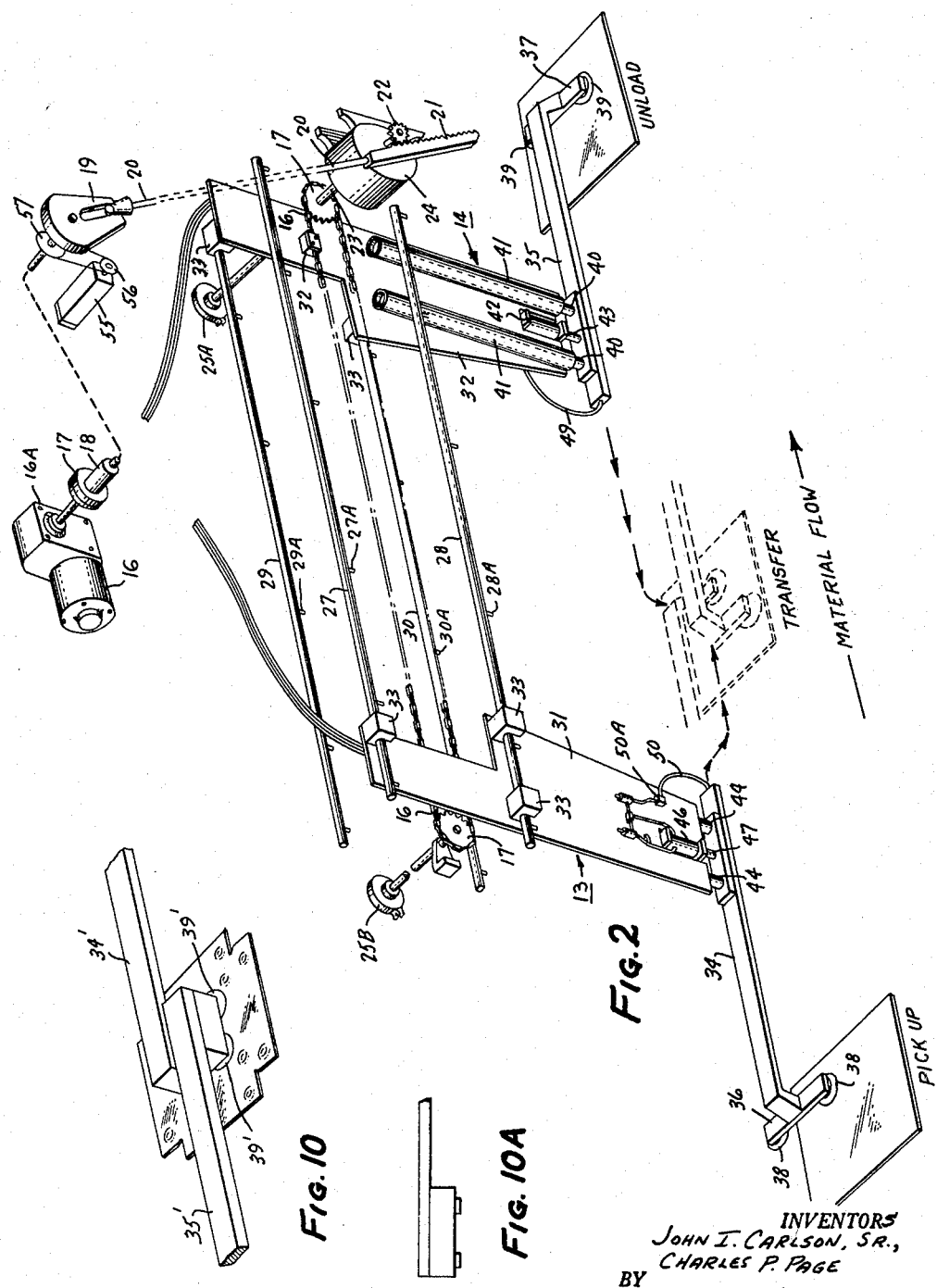

April 20, 1965   J. I. CARLSON, SR., ETAL   3,179,262
MATERIAL TRANSFERRING APPARATUS
Filed May 21, 1963   5 Sheets-Sheet 3

INVENTORS
JOHN I. CARLSON, SR.,
CHARLES P. PAGE
BY Robert H. Casey
ATTORNEY

April 20, 1965   J. I. CARLSON, SR., ETAL   3,179,262
MATERIAL TRANSFERRING APPARATUS Filed May 21, 1963   5 Sheets-Sheet 5

INVENTORS
JOHN I. CARLSON, SR.,
CHARLES P. PAGE
BY Robert T. Casey
ATTORNEY

United States Patent Office 3,179,262
Patented Apr. 20, 1965

3,179,262
MATERIAL TRANSFERRING APPARATUS
John I. Carlson, Sr., New Britain, and Charles P. Page, West Hartford, Conn., assignors to General Electric Company, a corporation of New York
Filed May 21, 1963, Ser. No. 281,893
13 Claims. (Cl. 214—1)

Our invention relates to material transferring apparatus, and more particularly to apparatus for automatically transferring work-pieces from a first work location, such as a first machine to a second work location such as a second machine. More particularly, the invention relates to apparatus for transferring sheet metal work-pieces of varying sizes, including pieces of substantial size and weight, such, for example as steel sheets varying in size from 7 inches by 9 inches to 38 inches by 54 inches from a first metal-working press to and inserting them into, a second metal-working press.

Apparatus for transferring a series of work-pieces of substantial size from a first machine to a second machine automatically, that is, without assistance of human agency, in acordance with the prior art, exhibit a number of serious disadvantages and limitations. In general, prior art apparatus provided for this purpose has been relatively large, heavy, cumbersome, and expensive. In addition, the design and weight of such apparatus has required that it be mounted or supported on the floor between the work stations or presses being served, thereby obstructing passage through such space at all times.

Moreover, such prior art apparatus has required special adaptation for particular size and shape of work-pieces to be handled, and so is not flexible, that is, cannot be quickly and easily changed to accommodate different sizes of pieces. Furthermore, such apparatus is limited inherently to relatively low speeds of operation.

It is an object of the present invention to provide material transferring apparatus for transferring work-pieces from one machine or work station to another machine or work station which permits passage between such machines or work stations when the apparatus is not in operation. It is a further object to provide such apparatus which, when not in operation, permits ready access to the machines or work stations for inspection repair, replacement of dies, etc.

It is another important object of the invention to provide material transferring apparatus which is extremely versatile, that is, which is not restricted to use with a particular type or size or work-piece. It is a further similar object of the invention to provide material transferring apparatus which is readily adaptable for use with machines of differing dimensions and characteristics, such as machines differing in (a) "reach," i.e., distance which an arm must extend through a restricted opening in order to reach the work-piece when in the machine, and (b) heights of die-bed levels. It is a further object to provide such apparatus which is usable between machines having differing distances from each other.

It is another important object of the invention to provide material transferring apparatus which is capable of operating at relatively high speeds.

Other objects of the invention will in part become obvious and in part be pointed out in the following detailed description of one embodiment of the invention.

In accordance with the invention in one form, we provide material transferring apparatus comprising a pair of oppositely extending horizontal arms, each having material holding or work-piece-engaging means at the outer end thereof. Means is also provided for moving the arms in reciprocating fashion, along a substantially rectilinear work-transfer path, toward and away from each other between a first position in which the work-piece-engaging means are closely adjacent each other, and a second position in which the work-piece-engaging means are widely separated. Means is further provided for exchanging a work-piece from one of said arms to the other, whereby one of said arms may pick up a work-piece from a first work station at the outer extreme of its travel and carry it part way toward the other work station to an exchanging position where it is taken by the work-piece-engaging means of the second arm, and thereafter carried forward by the second arm and deposited by the second arm in the second work station at its outer extreme of travel. This cycle is then repeated, with the arms simultaneously picking up and depositing work-pieces at their outer extremes of travel and exchanging work-pieces at their inner extreme of travel, to produce a flow of work-pieces from one work station to the other.

Furthermore, in accordance with the invention, means is also provided for causing the machines between which the work is transferred to operate on the work-piece which is deposited therein in synchronism with the transfer cycle. In a preferred form, for example, a work-piece is held at the mid or exchange position while pieces are being operated on in each of the presses.

In accordance with another aspect of the invention, the material transferring apparatus is supported from overhead by means extending between the two work stations or machines, thereby leaving the floor space therebetween unobstructed to permit passage and access to the machines when the material transferring apparatus is not in operation.

In accordance with another aspect of the invention the work-pieces are exchanged between the two arms in mid-air, so that no intermediate resting-place for such pieces is required which might obstruct passage, interfere with access to the machines, or slow down the cycle of operation.

The invention will be more fully understood from the following detailed description, taken in conjunction with the acompanying drawings, and the scope thereof will be particularly pointed out in the appended claims.

In the drawings,

FIGURE 1 is a side elevation view of automatic material transferring apparatus constructed in accordance with the invention and shown as installed for use in transferring sheet metal work-pieces in succession between two work stations, comprising a punch press and a "knock-out" press respectively;

FIGURE 2 is a perspective view, with portions of the enclosing and supporting structure omitted for clarity, of the material transferring apparatus of FIGURE 1;

FIGURE 8 is a diagram showing the paths of movement of the work-piece-engaging or material-holding portions of the apparatus of FIGURE 1;

FIGURE 10 is a fragmentary perspective view of a alternate form of work-engaging means for use with the apparatus of FIGURE 1;

Figure 11:
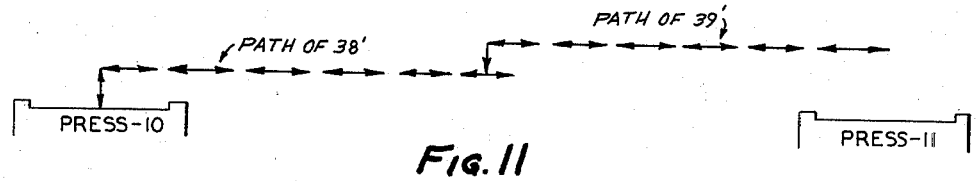
Figure 12:
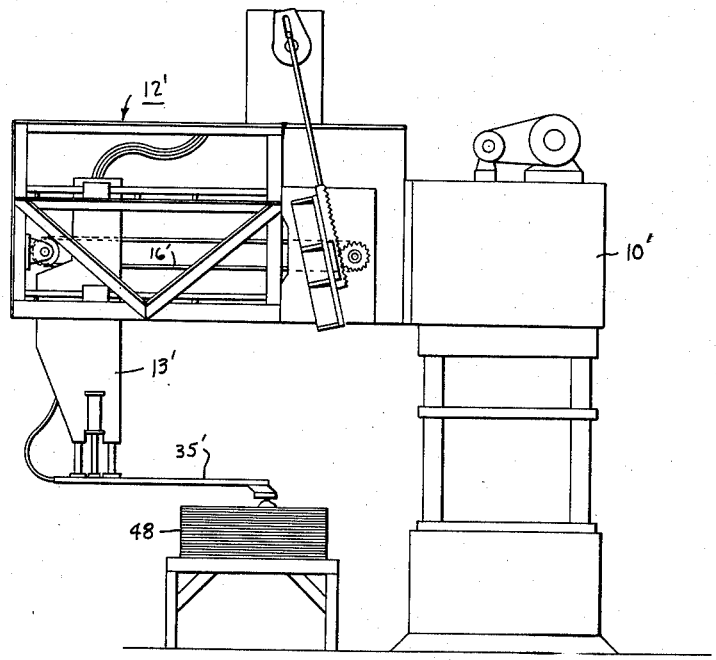

FIGUE 10A is a fragmentary view of another alternate form of work-piece engaging means for use with the apparatus of FIGURE 1;

FIGURE 11 is a diagram showing the paths of movement of work-piece-engaging means according to another form of the invention, and FIGURE 12 is a side elevation view of a form of the invention as used in a "single-ended" application, that is, for loading or unloading a single machine as compared to transferring material from one machine to another.

Referring to FIGURE 1, the invention is shown as incorporated in automatic material transferring apparatus used to transfer sheet metal material between two machines shown, by way of illustration only, as punch press 10 and "knockout" press 11, the material transferring apparatus being designated generally at 12.

The automatic transferring apparatus includes a pair of travelling arm assemblies 13 and 14 which are supported for reciprocal horizontal movement on a supporting frame 15 in a manner to be described. The arm assemblies 13 and 14 are movable reciprocally by means of an endless drive chain 16, mounted on sprockets 17, only one shown.

The drive chain 16 is driven alternately in opposite directions by drive means shown more particularly in FIGURE 2. As shown in FIGURE 2, the drive means for the arm assemblies 13 and 14 includes a main driving motor 16, a gear-reduction box 16A, and a clutch 17, adapted to be operated by solenoid 18 and connected to an eccentric or crank-arm 19. The crank-arm 19, in turn, is connected by means of connecting-rod 20 to rack-and-pinion gear arrangement including a rack gear 21 and a pinion gear 22. The pinion gear 22 is fixedly mounted to the shaft or axle 23 which also carries a variable gear mechanism 24. Each of the sprockets 17 has associated therewith a solenoid operated brake 25A and 25B, respectively.

The arm assemblies 13 and 14 are each supported by a pair of rods 27, 28 and 29, 30 respectively. Each of the assemblies 13, 14 includes a main supporting plate 31, 32, respectively, and each of the plates 31 and 32 carries a plurality of recirculating-ball type closed bearings 33, adapted to ride along the rods 27-30, and are open at the bottom to clear the supporting posts 27A, 28A, 29A and 30A for the rods, respectively.

Assuming the motor 16 to be running, engagement of the clutch 17 and simultaneous release of the brakes 25A, 25B causes rotation of the crank arm 19 and reciprocal movement of the connecting arm 20. Reciprocation of the arm 20 carries with it the rack gear 21 which in turn drives the pinion gear 22 and causes rotation of the shaft 23 alternately clockwise and counterclockwise, carrying with it the drive chain 16. The arm assemblies 13 and 14 are connected to opposite side portions respectively of the drive chain 16 by suitable anchoring means 32, 33, causing the assemblies 13, 14 to be moved horizontally in opposite directions simultaneously between extremes of travel as determined by the length of the drive chain 16.

It will be observed that the supporting plates 31, 32, for the pick-up arm assemblies 13 and 14, are on opposite sides respectively of the drive chain 16, and also are disposed and arranged so that they can by-pass each other in travelling between opposite extreme ends of the drive chain 16.

For the purpose of picking up and removing, or of inserting parts in the presses 10 and 11 respectively, the assemblies 13 and 14 are provided with elongated pick-up arms 34, 35 respectively. As shown particularly in FIGURE 1, the supporting frame 15 is mounted between the two machines 10 and 11 at a substantial height H above the plane of the floor P, on which the machines rest by suitable means, such as by connection to corresponding parts of the machines 10 and 11. The horizontally extending arms 34, 35, are supported at a distance D below the frame 15, the distance D being substantially less than the height H. The main floorspace between the machines 10 and 11 is therefore left unimpeded.

In the embodiment shown in FIGURES 1 and 2, the pick-up arms 34 and 35 are provided with transversely extending pick-up head assemblies comprising cross-bars 36, 37 respectively, carrying pairs of suction cups 38, 39, respectively. The assembly comprising the pick-up arm 34, its cross-bar 36, and the suction cups 38, is also movable vertically with respect to its carrying plate 31. The assembly comprising the pick-up arm 35, its cross-bar 37, and the suction cups 39, is likewise movable as a whole vertically with respect to its carrying plate 32. For this purpose, the pick-up arm 35 is provided with guide rods 40 slidably mounted in guide cylinders 41, and a vertical-motion-controlling air cylinder 42, having a vertically movable plunger 43 connected to the arm 35. The arm 34 likewise has corresponding vertical movement controlling parts 44, 45, 46, 47, respectively.

As the assemblies 13, 14 move between their extremes of horizontal movement, the pick-up heads 38, 39, are alternately moved between "Position 2", in which they extend within the presses 10 and 11 respectively, and "Position 1", in which they are adjacent each other at a point mid-way between the presses 10 and 11 (see FIGURES 1 and 2). During this movement, the main portions of the pick-up assemblies 13 and 14 by-pass each other in moving between the opposite ends of their travel. The suction cup pick-up heads 38, 39, however, do *not* by-pass each other but in Postion 1 are brought closely adjacent each other, as shown particularly in dotted lines in FIGURES 1 and 2. It will be observed that in Position 1, the "exchange" position, the arm 34 overlies the cross-arm 37 of arm 35, and arm 35 likewise overlies the cross-arm 36 of arm 34.

*Material transfer cycle*

The main points in a complete cycle of transfer of material such as flat sheet metal blanks 48A, 48B, are shown in the sequence of FIGURES 3–6 inclusive, designated Position 1–4, respectively.

Figure 3:
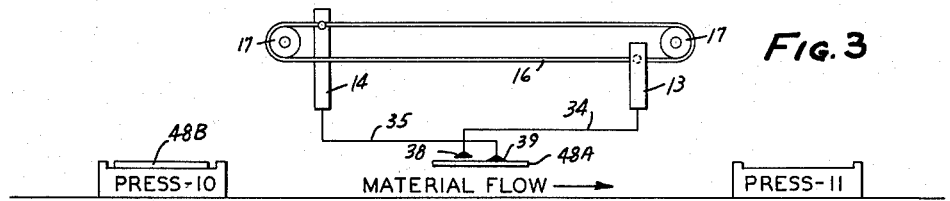
FIGURES 3–6 are semi-diagrammatic representations of operating portions of the apparatus of FIGURE 1, shown in different operated conditions.
Figure 4:
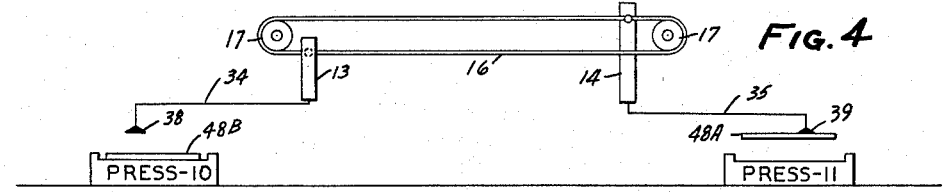
Figure 5:
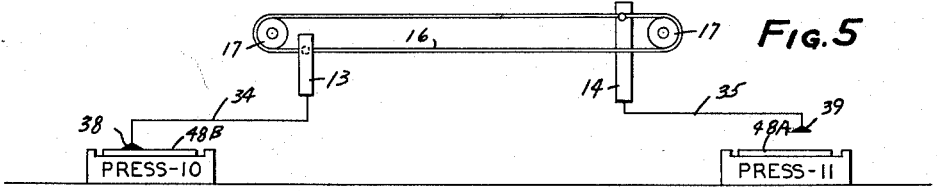

Assuming the parts to be in the condition shown in FIGURE 3, which is designated "Position 1" the part 48A has just been exchanged from the heads 38 to the heads 39, a vacuum being applied to the heads 39 through the air hose 49. As the drive chain 16 moves, the arm assembly 14 with arm 35 and heads 39, moves to the extreme right, carrying the piece 48A into the press 11, to "Position 2", as shown in FIGURE 4. At the same time, the pick-up arm assembly 13 moves from right to left, moving the pick-up heads 38 into the press 10. With the parts in this position, the vacuum is removed from the pick-up heads 39 and the part 48A drops into place in press 11. Substantially simultaneously, the pick-up arm 34 is moved downward vertically until the pick-up heads 38 are in contact with the surface of a second piece 48B in press 10, and vacuum is applied thereto through air hose 50. This is shown as Position 3, in FIGURE 5.

Figure 6:
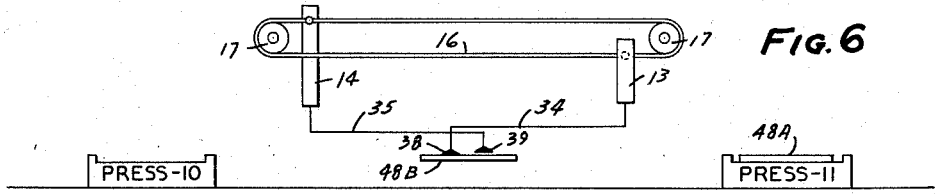

The arm 34 is then moved upward vertically, lifting the part 48B out of the die-bed of the press 10 and clear of any pilot pins, etc., not shown, which may be used to position the part. The drive chain 16 is then moved in the opposite direction, moving the pick-up arm assembly 13 to the right as viewed and simultaneously moving the pick-up arm assembly 14 to the left as viewed, the parts then moving "Position 4," as shown in FIGURE 6.

It will be observed that in FIGURE 4, the part 48B is carried by the pick-up heads 38 of the assembly 13, while the pick-up heads 39 of the assembly 14 are spaced *above* the upper surface of the piece 48B. This assures that the pick-up heads 39 the assembly 14 will clear the leading edge of the piece 48B as the parts move to this position.

Following this, the parts move so as to bring the pick-up heads 39 into engagement with the upper surface of the part 48B. Next, a vacuum is applied to the pick-up heads 39, and immediately thereafter removed from the pick-up heads 38. This transfers the part from the control of the arm assembly 13 to the control of the arm assembly 14. Subsequent movements are a repetition of the cycle just described, the assembly 14 then moving to the right as viewed, to insert the part 48B in the press 11.

It will be observed from FIGURE 8, that in moving outwardly, the arms 34, 35 first move in a straight line, then upwardly, and then again in a straight line. The initial straight-line movement is to permit each of the cross-arms 36, 37 to move out from under the corresponding arms 35, 34. The subsequent upward movement is to assure clearance of the pilot pins of the dies.

In the installation shown in FIGURE 1, the parts 48 may be loaded into the machine 10 by any suitable means such as manually, and the parts may also be removed from press 11 by any suitable means such as manually. It will be readily appreciated, however, that similar apparatus may be used to transfer parts into the press 10 automatically or remove them from press 11 automatically, to provide a fully automated production line.

*Transfer arm and head motion control*

The horizontal motion of the arm assemblies 13 and 14, the vertical motion of the arms 34 and 35, and the pick-up and releasing action of the heads 38, 39, are all controlled by solenoids in the following manner. The pick-up and releasing actions of the heads 38 and 39 are controlled by solenoid-operated valves such as 50A (only one shown, see FIGURE 2) which control passage through the air tubing 50 and 49, respectively. Vertical lifting motion of the arms 34 and 35 is controlled by solenoids (not shown) carried by the plates 31, 32, respectively, which control the air line feeding the air cylinders 42, 46, respectively.

The aforesaid solenoids controlling the vacuum to the pick-up heads and the vertical movement of the arms, are in turn controlled by a plurality of cam-operated switches, all contained within a single housing and mounted on a common shaft for a simultaneous operation, the whole forming a cam switch indicated generally at 55 in FIGURE 2, which is mounted adjacent the output shaft of the motor 16 and which is directly coupled by means of gears 56, 57 to this shaft. Since the cam switch 55 is directly geared to the shaft supporting the eccentric 19, the cams of the cam switch 55 occupy a particular identifiable position for each angular position of the eccentric 19. Because of the rack-and-pinion connection, 21, 22, the motion of the arms 13, 14 in going through a full cycle may therefore be related, in terms of degrees, to a full cycle of rotation of the eccentric or crank-arm 19. It will be observed that by means of the cam switch 55, the use of limit switches is avoided, and complete synchronism of the movement of the parts is assured. It will also be observed that by reasons of the sinusoidal motion imparted to the drive-chain 16 by the rack-and-pinion and eccentric connection, the arm assemblies 13 and 14 are smoothly accelerated, and brought to a stop at each extreme of travel without severe jarring forces, and without impact on any of the parts.

Figure 7:
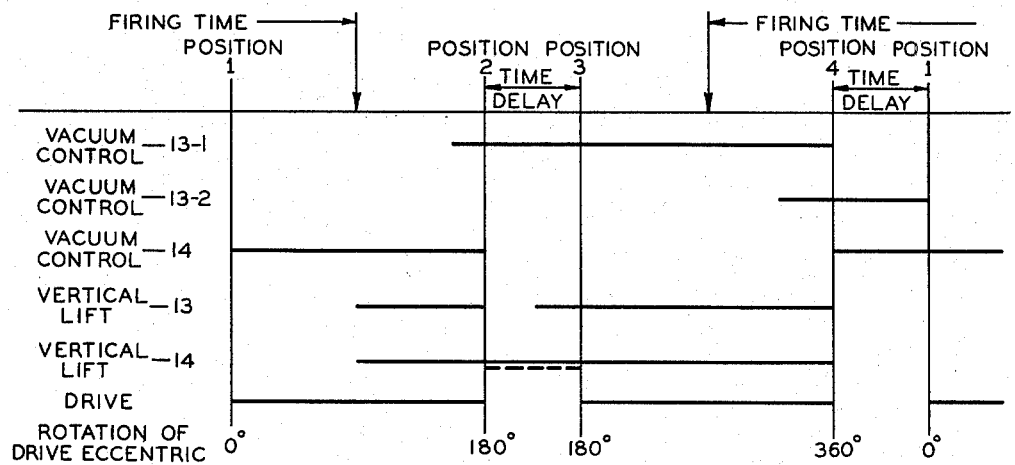
FIGURE 7 is a time sequence chart showing the operated conditions of various control components utilized in the apparatus of FIGURE 1.

In FIGURE 7, the instantaneous condition of the control components and the rotation of the eccentric 19 are shown for a specified period of time. It will be noted that there is a time-delay at the 180° point, and also at the 360° point in the cycle. At the 180° point ("Position 2") the time-delay is utilized to permit the arm 34 to be lowered vertically, to permit a vacuum to be drawn on the pick-up heads 38 to pick-up a work-piece 48B, and to permit the arm 34 to again move vertically upward to lift the piece out of the die of press 10. During this time, the vacuum on the head 39 is also being released, to drop the work-piece 48A into the press 11. It will be readily appreciated, that, if desired, instead of dropping the piece 48A into the press 11, the arm 35 may be lowered vertically to set the piece 48A into the press 11, the piece then being released by releasing the vacuum on the head 39, and the arm 35 moved upwardly again.

The time-delay shown at the 360° point, that is, between Position 4 and Position 1, is utilized to bring the arm 35 down vertically at the exchange position so as to bring the pick-up heads 39 into engagement with the upper surface of the work-piece 48A, and also to draw a vacuum on the pick-up heads 39 and substantially simultaneously to release the vacuum on the pick-up heads 38, so that the work-piece 48A is transferred from the control of the arm assembly 13 to the control of the arm assembly 14.

*Press operation*

In accordance with the invention, means is provided for executing a complete cycle of operation. Accordingly, assuming a piece to have been manually or otherwise inserted in the press 10, and the press 10 to have been manually or otherwise "fired," such as by pressing "start" push-button 60, removal of the work-piece from press 10 and its transfer to press 11 and operation on it by press 11, all occur thereafter automatically and in proper synchronism. The entire cycle may then be repeated by operator inserting another work-piece into the press 10 and pressing the push-button 60. The transfer arm assemblies 13 and 14 will, at the time of operation of the press 10, be substantially in the "Position 1" condition, in which a previously worked-on part has been brought to the exchange position and transferred to the arm 14. Following operation of the press 10, the transfer arms will go through a cycle of movement through Positions 1 through 4, by means of which the part just worked on in press 10 is brought to the mid or exchanged position, the parts then stopping at that position and waiting until another part is inserted and operated on by the press 10.

*Electrical circuitry and protective functions*

Figure 9:
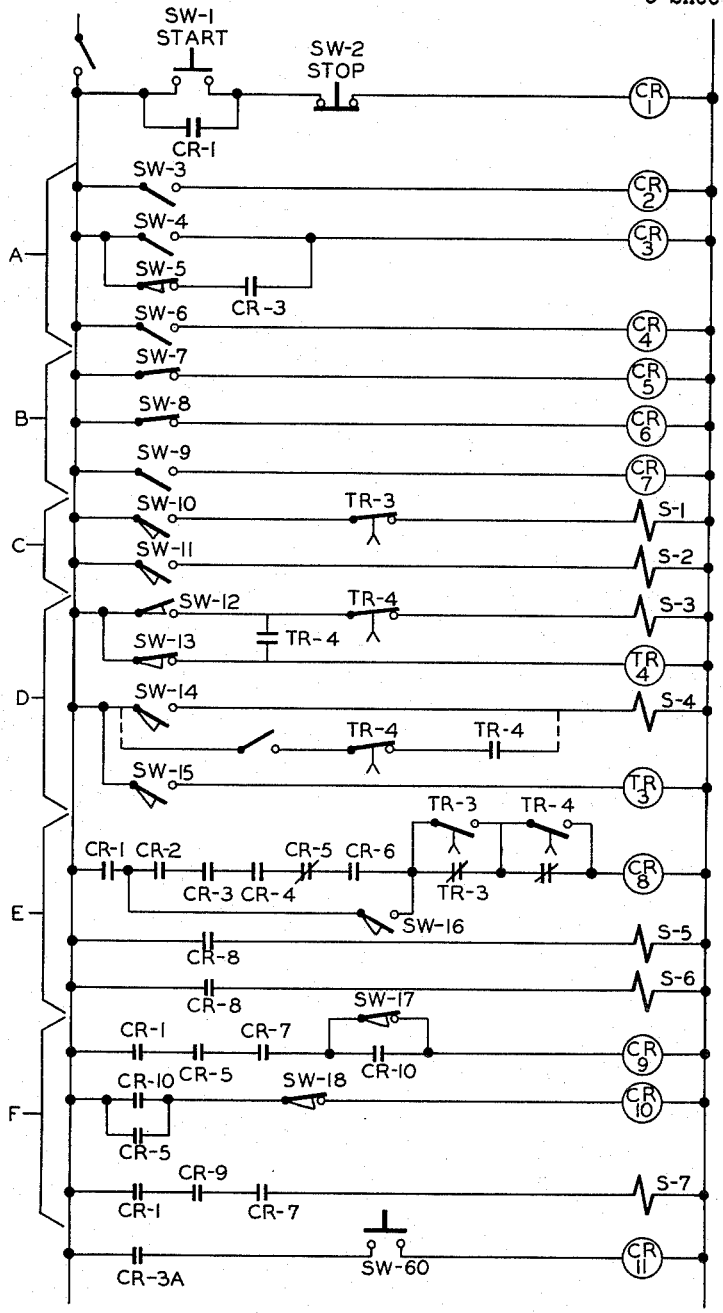
FIGURE 9 is a wiring diagram of the control circuitry for the apparatus of FIGURE 1.

The electric circuit diagram for the apparatus illustrated in FIGURE 1 is shown in FIGURE 9. This circuit may conveniently be discussed in six portions, as follows: (*a*) Information Concerning Press 10, (*b*) Information Concerning Press 11, (*c*) Pick-up Head Controls, (*d*) Transfer Arms Vertical Motion Controls, (*e*) Transfer Arms Horizontal Motion Control and (*f*) Press 11 Firing Control.

Referring now to the schematic diagram, assuming the start switch SW1 to be pressed, the contactor CR1 will be energized, closing the contacts CR1 by-passing the switch SW1, the contactor CR1 therefore remaining closed or "locked in." Nothing further will occur, however, until a part is inserted in the press 10 and the start button 60 of press 10 is actuated, causing press 10 to run through its work cycle, operating on the part of 10 and returning to its full open position. This is assured by the connections to contactor CR8, which controls the pick-up arm horizontal motion drive. The contactor CR8 controls the solenoid S5 which causes the clutch 17 to engage and simultaneously disengages the brake 25A, and also controls the solenoid S6 which disengages the brake 25B.

The protective functions referred to are provided by the inclusion of contacts in series with the contact CR8 which are controlled by the contactors 2, 3, 4, 5, and 6 respectively. Thus the contacts CR2 are closed by contactor CR2 only when SW3 is closed, and SW3 is closed only when there is a work-piece in the press 10. Likewise the contacts CR3 are used to indicate that the press has "cycled," that is, that it has gone through its work cycle on the piece which has been inserted in the press. This switch may comprise a small limit-switch type of switch SW4, which is engaged and actuated by the press ram only when the press ram is on the up-stroke, and furthermore, only when the cam switch 55 is in a proper part of the cycle as to hold the switch SW5 in the closed condition so that the contactor CR3 may lock itself in around the switch SW4. Similarly, contacts CR4 indicate that the press has moved to its "full open" position, thus indicating that it is safe for the arm 34 of the transfer mechanism to reach into the press. If all of these conditions are met, the circuit will then be complete through TR3 and TR4 to contactor CR8, which is energized, releasing the brakes 25A, 25B and engaging the clutch 17 to cause outward horizontal movement of the arms 34, 35.

Outward horizontal movement of the transfer arms continues until the outer extreme position is reached, that is, Position 2, as shown in FIGURE 4. When the parts reach this position the cam switch 13 is cammed closed, energizing relay TR4, instantly opening the contacts TR4 in the transfer arm drive circuit which controls relay CR8, and stopping horizontal movement. At the same time, TR4 also closes TR4 "instantaneous" contacts in the circuit which controls solenoid S3, thereby moving the arm and head of arm 34 down, to piece pick-up position. Also, when TR4 closes, it starts normally-closed timed contacts TR4, also in the S3 circuit, to "time" open, and starts normally-open contacts TR4 in series with transfer arm drive control relay CR8 to "time" closed.

When the time runs out on timed relay TR4, the normally-closed contacts TR4 in series with the solenoid S3 move to open position, bring the arm 34 up again. At the same time, the timed normally-open contacts TR4 in series with the transfer arm drive relay CR8 time closed, and CR8 is energized, starting the transfer arm drive in motion, moving the arms inward horizontally. The circuit CR8 is completed at this time regardless of the condition of the contacts CR2–6, since these contacts are bypassed at this time by the cam switch contacts SW16, which are closed by cam switch 55 just as the arms complete their outward travel.

As the arms approach the inner or 360° position, (same position as 0°) the switch SW15 is closed by cam action and energizes time delay relay TR3. Relay TR3 instantly opens the normally closed contacts TR3 in series with the relay CR8, thereby stopping the drive motion. At the same time, the normally-open timed contacts TR3 in the transfer arm drive circuit start "timing" closed. This provides the time delay for vertical motion of the transfer arm 35 to bring the pick-up heads of both arms to the same level to facilitate the exchange of the piece. When the timed contacts TR3 close, a circuit is then completed through SW16 and through TR4 to the relay CR8, which again starts the transfer arm drive. After a small amount of motion, the cam switch SW16 is opened again, placing all the protective contacts CR2–6 back in circuit, and the condition is as originally described.

*Press 11 firing control*

Referring to the portion F of the wiring diagram, the operation of the press 11 firing control circuit is as follows. Assuming press 11 to be at the top of its stroke, that is, full-open, relay CR9 will be energized, and press 11 will be fired, if the following conditions are satisfied: (1) Start button has been pressed (CR1 energized); there is a part in the die of press 11 (CR5 energized); the transfer arm 35 is clear of the press 11 (CR7 energized); the press 11 is full-open (SW17 closed). It will now be observed that, with firing of press 11 impending, the relay CR10 will have been energized by the closing of the contacts CR5, through the normally closed cam switch contact SW18. When the relay CR10 closes, it locks itself in through the contacts CR10 in parallel with the contacts CR5.

The contacts CR5 are normally closed, and are opened when a part is placed in the die of press 11. Upon removal of a part from the die of press 11, after it has been worked on, therefore, the contacts CR5 close, energizing relay CR10 which locks itself in through contacts CR10 in parallel with the contacts CR5. When a part is subsequently placed in the die of the press 11 by the transfer arm 35, therefore, the contacts CR5 in the relay CR10 circuit are opened, but the relay CR10 remains energized through its own contacts CR10 in series with the normally closed switch SW18.

The switch SW17 is normally closed and is opened only when the press 11 is in the full-open position. When the transfer arm 35 clears the press 11 therefore, the limit switch SW9 is closed, energizing the relay CR7 and firing the press 11 by completing the circuit to the relay CR9. It will be observed that the contacts CR10 at this time are in closed condition since the relay CR10 is closed as previously described.

When the press 11 has gone past the 180° mark and worked on the piece in the die, and begins its upstroke, it operates the limit switch SW18, thereby dropping out of the relay CR10. It will be observed that while relay CR10 drops out at this time, the press 11 does not stop, since the circuit to the relay CR9 is still completed through the switch SW17. The motion of the press therefore continues to the full-open position where it engages the limit switch SW17, interrupting the circuit to the relay CR9 and shutting off the press drive.

It will now be observed that the press 11 will not go through a repeat cycle, since it cannot fire until the relay CR10 is energized, and the relay CR10 is not energized until the part is removed from the press. At the same time, removal of the part from the press, while it energizes the relay CR10, also opens the contacts CR5 in series with the relay CR9 thereby preventing operation of the press until another part is inserted in the press. In other words, following operation of the press 11, the part must be removed and another part inserted before the press will operate again.

*Modified pick-up heads FIGURE 10*

In FIGURE 10 there is shown a modified form of pick-up heads. In accordance with this form, each of the pick-up arms 34′ and 35′ include a pair of suction type pick-up elements 38′ and 39′ respectively which are disposed on the longitudinal axis of the arms 34′ and 35′ respectively, rather than transversely thereto as in the form of FIGURE 2. This arrangement simplifies the construction of the pick-up arms, and is suitable for use with relatively small work pieces. In this form of the invention, the path of movement of the pick-up heads may be simplified, as shown for example in FIGURE 11. Thus the path of the heads 39′ can be a reciprocal straight line motion with a vertical dip only at one end that is, to pick the part of the die of the press 10. The path of the head 38′ can likewise be a simple reciprocal straight line motion with a dip only at the mid or exchange point in order to pick-up the work piece from the head 39′ at this point.

*Interlocking of arm 34 with press 10*

Cam switch SW5 is closed from zero degrees to slightly more than 180° of the cam switch motion 55, that is, it is closed from Position 1 through Position 2 of the arms 34, 35. Press 10 is fired (manually) when the arms 34, 35 are in Position 1, and the switch SW5 is closed. Switch SW4 is closed momentarily by the passage of the ram of press 10, and it energizes relay CR3, which locks itself in through the switch SW5. The relay CR3 remains energized until the arm 34 has gone through its travel of entering the machine and removing the part which has been worked on. When the arm 34 has reached the point of its travel where the cam switch 15 has gone past the 180° point, the switch SW5 is opened momentarily, thus dropping out the relay CR3 which remains open until the press 10 has operated again. This prevents re-entry of the pick-up arm 34 until the press 10 has once more "cycled."

*"Chain" operation*

For purposes of simplifying the explanation and aiding in an understanding of the invention, the operation of the press 10 has been shown as left entirely to the control of a manually operable switch 60 under the control of a human operator. With this arrangement, the operator, not shown, is depended upon to operate the press 10 at the proper time, that is, after the transfer arms 34, 35 have completed their cycle of movement and the arm 34 is clear to the press 10 and preferably at the 0° position (Position 1). It will be readily apparent, however, that the same protective expedients described in connection with press 11 may be used in connection with press 10 to disable the press firing circuit of this press in the event that (1) no part had been placed in the die of press 10, (2) the arm 34 is not clear of the press 10, and to prevent a repeat operation of the press upon the same piece in the die.

It will now also be observed that a third press, not shown, may be stationed to the right of press 11 and an automatic material transferring unit similar to that just described may be installed between press 11 and the additional press, to automatically take the pieces out of press 11, transfer them to and insert them into the succeeding press. Press 11 would then occupy the same position relative to the added transferring apparatus as press 10 occupies with relation to transferring apparatus 12, and the added press would occupy the same position relative to the added transferring apparatus as press 11 does with respect to the apparatus 12. For example, in the embodiment illustrated in FIGURE 1, the material transferring apparatus indicated generally at 12 works in slave relationship to the press 10, but in master relation to the press 11. The next succeeding material transferring apparatus would accordingly act in slave relation to the press 11 and in master relation to the added press. Thus as many units as desired may be added in an in-line relationship to provide a fully automated production line.

Feed-in and fed-out line termination

Referring to FIGURE 12, material transferring apparatus constructed in accordance with the invention is shown as used for the purpose of feeding parts into a press at the start of an automatic line or for removing parts from a press at the end of a line. In this embodiment, only one assembly 13' is used, the arm 35' operating to pick up work-pieces 48 from a suitably maintained stack of pieces when in feed-in operation, to insert them in the press 10'. When in feed-out operation, the arm 35' operates to pick up work-pieces from the die bed of the press 10' and deposit them in a stock, a suitable receptacle or on a conveyor.

Line interruption

At times it may be desirable to run parts through only certain machines in an automatic line, such for example as only through press 10, although it is desired to have the parts automatically removed therefrom by the same equipment which is ordinarily used to maintain a continuous flow of the parts from one machine to another. This may readily be accomplished with the apparatus of the present invention without any structural modification simply by shutting off the airflow path to selected pick-up heads such as the pick-up heads 39. At the exchange point in the cycle, therefore, the work-piece would merely be dropped into a suitable container or onto a conveyor belt arranged for this purpose.

It will be apparent that the distance between the presses 10 and 11 may be varied within predetermined limits without varying the length of the drive chain 16 or the distance between the sockets 17. Beyond the limits set by the distance between the sockets 17, greater distances can be covered by use of additional material transferring apparatus, the work-pieces being exchanged at two or more points in between the machines or work locations being serviced.

The flexibility of the equipment which may be provided in accordance with the invention is well illustrated by the fact that in a particular embodiment the apparatus was successfully used to transfer work-pieces ranging in size from a small size of 7 x 9 or 63 square inches to a large size of 38 x 54 or over 2000 square inches, from one machine to another.

It will also be readily apparent that differences in the vertical height of pick-up and the deposit stations with respect to a common floor, can be accommodated by adjusting the corresponding vertical movement of the pick-up arms 35 and 35, at the outer extremes of their travel. The vertical travel at the exchange point however, would be maintained so that the pick-up heads are exactly at the same level at the time when the work-piece is transferred.

Also in accordance with the invention, two sets of drive chains 16 may be utilized in transferring apparatus otherwise as shown in FIGURE 1, with one pick-up arm assembly carried by one of the drive chains and the other pick-up arm assembly carried by the other drive chain. This would, in effect, provide completely independent unloading means for the press 10 and loading means for the press 11. Thus, for example, pieces of a first size and type could be processed in machine 10 and automatically unloaded therefrom by the arm 34, while pieces of different size and nature could be automatically loaded into the press 11 for processing thereby. Nevertheless, the same equipment could, when desired, be used for feed-through operation as illustrated in FIGURE 1.

While the vacuum cup pick-up structure disclosed in the foregoing description has particularly useful characteristics in being suitable for use with materials of different types, including magnetic and non-magnetic materials, other types of pick-up means may be used for certain application, such for example as electromagnets. It will be observed in this connection that since the pick-up means engages the work-pieces near their center area, the exact dimensions of the piece or its outer outline are not critical, and therefore the size of the pieces being worked with may be varied without varying the pick-up point and therefore the length of travel of the pick-up arms, and also without particular adjustment of the pick-up means itself. This mode of handling the work-pieces also maintains the orientation of the piece accurately, so that it can be readily placed or dropped into position.

While the invention has been shown only in certain particular embodiments, it will be readily apparent that many modifications thereof may readily be made. It is therefore intended by the appended claims to cover all such modifications as fall within the true spirit and scope of the invention.

What we claim as new and desire to secure by Letters Patent of the United States is:

1. Material transferring apparatus comprising:
   (a) a support,
   (b) means supporting said support at a predetermined height above a given reference plane,
   (c) at least one pair of elongated arms movably supported from said support in substantially co-planar relation at a distance below said support less than said height,
   (d) means carried by said support and guiding said arms for reciprocal substantially rectilinear movement toward and away from each other,
   (e) material holding means carried by each of said arms at one extremity thereof,
   (f) said arms being movable to a position where said material holding means of both of said arms are in substantially side-by-side relation whereby material held by said holding means of one of said arms may be exchanged directly to the said holding means of the other of said arms.

2. Material transferring apparatus comprising:
   (a) a support,
   (b) means supporting said support at a predetermined height above a given reference plane,
   (c) at least one pair of elongated arms, said arms each having one end thereof supported from said support at a distance below said support less than said height the major portions of said arms extending away from said supported ends in opposite directions, in substantially co-planar relation in a plane parallel to said reference plane, (d) material holding means carried by each of said arms at the ends thereof remote from said supported ends, (e) means for moving said arms in reciprocal fashion along substantially rectilinear paths of movement respectively between a first position in which said arms are bodily separated and said material holding means thereof are remote from each other, and a second position in which said arms are in at least partially side-by-side relation and the material holding means thereof are in side-by-side co-planar relation, whereby material may be engaged by said material holding means of one of said arms when said arms are in said first position and carried by said arm to said second position and exchanged at said second position to the other of said arms for continued movement in the same general direction.

3. Apparatus for transferring material from a first work station of predetermined height to a second work station of predetermined height comprising:

(a) support means between said work stations and means supporting said support means at a height substantially greater than the height of either of said work stations, (b) at least one pair of material handling arms supported from said support at a height substantially equal to the height of said work stations, (c) guide means carried by said support for guiding said arms for reciprocal substantially rectilinear movement between said work stations, (d) a first one of said arms having one end thereof supported on said support means and having a free end portion extending therefrom toward a first one of said work stations, (e) material holding means carried by said first arm adjacent said free end, (f) the second of said arms having one end thereof supported on said support means and having a free end portion extending therefrom toward the other of said work stations, (g) material holding means carried by said second arm adjacent the free end thereof, (h) said arms being movable between a first extreme of travel in which said material holding means of said first arm is positioned substantially directly over said first work station and said material holding means of said second arm is positioned substantially directly over said second work station and a second extreme position in which said material holding means of said first and second arms are closely adjacent each other in substantially co-planar relation at a point between said work stations, whereby material may be picked up by said material holding means of said first arm from said first work station and transferred in mid-air to said material holding means of said second arm and then transferred by said second arm to said second work station.

4. Material transferring apparatus as set forth in claim 3 wherein said apparatus also comprises means for moving said material holding means of at least one of said arm assemblies at right angles to the path of movement of said arms when said holding means is over at least one of said work stations.

5. Material transferring apparatus comprising:

(a) a support, (b) a pair of rotatable guide means spaced apart on said support, (c) an endless flexible driving belt carried by said rotatable guide means on said support, (d) a pair of material handling arm assemblies supported for longitudinal sliding movement on said support in a direction parallel to said belt, (e) means attaching said arm assemblies to opposite side portions of said belt respectively whereby movement of said drive belt about said rotatable guide means causes longitudinal motion of said arm assemblies in opposite directions respectively, (f) each of said arm assemblies comprising a material handling arm having one end thereof attached to said arm assembly and carrying material holding means at the other end thereof, (g) means for moving said material holding means in a direction perpendicular to the direction of said longitudinal sliding movement of said arm, (h) said arm assemblies being movable between a first position in which said arm assemblies are spaced apart longitudinally in the direction of said driving belt with said arm extending outwardly therefrom respectively, and a second position in which the said attached ends of said arm assemblies are spaced apart longitudinally in the direction of said driving belt and said arms are extending toward each other respectively with said material holding means in substantially side-by-side co-planar relation whereby to facilitate transfer of workpieces from one of said holding means to the other.

6. Material transferring apparatus as set forth in claim 5 wherein each of said material handling arms is movable in a direction at right angles to the direction of said driving belt whereby to move said material holding means in a direction perpendicular to said direction of said driving belt when said arm assemblies are in said first position.

7. Material transferring apparatus comprising:

(a) a support, (b) at least one pair of rotatable guide means supported in spaced apart relation on said support, (c) an endless flexible driving belt supported on said rotatable supporting means, (d) a pair of material handling arm assemblies supported on said support for reciprocal sliding movement in a direction parallel to said driving belt, (e) means attaching said arm assemblies to opposite side portions of said driving belt respectively, whereby movement of said driving belt around said rotatable means causes movement of said arm assemblies in opposite directions respectively, (f) said arm assemblies each comprising a material handling arm having one end thereof attached to said arm assembly and carrying material holding means at the other end thereof, said material handling arm extending away from each other in opposite directions from their said attached ends respectively when said arm assemblies are at their extreme of travel in one direction, said material handling arms extending toward each other when said assemblies are in the opposite extreme of travel whereby to bring said material holding means in substantially co-planar juxtaposed relation, (g) rotatable driving means comprising a shaft and a crank arm carried thereby, (h) a rack-and-gear combination carried by said support, (i) a connecting rod connecting said rack to a point of said crank-arm eccentric to said shaft center, (j) said parts being dimensioned and arranged so that one-half revolution of said crank arm causes movement of said driving belt to move said arm assemblies from one extreme of travel to the other extreme of travel and the succeeding one-half revolution serves to move said driving belt to move said arm assemblies from said second extreme of travel back to said first extreme of travel.

8. Material transferring apparatus as set forth in claim 7 wherein said apparatus also includes a multiple type cam switch connected in positive relation to said main driving shaft, whereby the rotational position of said cam switch bears a positive predetermined relation to the position of travel of said arm assemblies.

9. Material transferring apparatus comprising:
(a) a pair of elongated arms,
(b) support means,
(c) means supporting said arms on said support for reciprocal substantially rectilinear movement toward and away from each other in at least partially by-passing relation,
(d) each of said arms terminating in a transversely extending pick-up head portion, said transversely extending head portion having material holding means at at least each of the opposite ends thereof,
(e) each of said arms, in at least one position thereof including a portion overlying the transversely extending head portion of the other of said arms.

10. Material transferring apparatus comprising:
(a) a support,
(b) a pair of elongated arms,
(c) means mounting one end of each of said arms for sliding movement on said support, said arms extending in opposite directions from their point of attachment to said support respectively,
(d) means for moving said arms in reciprocal fashion along a generally rectilinear path of movement between a first position in which said arms are spaced apart in the direction of their movement and a second position in which at least portions of said arms are in side-by-side overlapping arrangement,
(e) each of said arms terminating in a transversely extending head portion defining a T-shaped configuration, each of said transversely extending head portions carrying material holding means at the opposite ends thereof,
(f) each of said arms when in said second position including a portion extending over a portion of the transversely extending head portion of the other arm.

11. Material transferring apparatus for use in transferring material from a first work station to a second work station comprising:
(a) a first elongated arm having material holding means at one end thereof,
(b) a second elongated arm having material holding means at the end thereof,
(c) means for moving said elongated arms in reciprocal fashion along a substantially rectilinear path between said work stations between a first position in which said material holding means of said first arm is positioned over said first work station and said material holding means of said second arm is positioned over said second work station and a second position in which said material holding means of both of said arms are in closely adjacent position,
(d) means for indicating the presence of a work-piece in said first work station,
(e) switch means for indicating the readiness of said work-piece to be removed from said first work station,
(f) means for indicating the absence of a work-piece in said second work station, means for indicating accessibility to said second work station, and means for preventing the automatic operation of said material transfer equipment upon the occurrence of predetermined current conditions of at least one of said indicating means.

12. Material transferring apparatus for transferring sheet metal material from a first press to a second press, comprising:
(a) a first elongated arm,
(b) work piece holding means carried by one end of said arm,
(c) a second elongated arm,
(d) second work holding means carried by one end of said second arm,
(e) means supporting said arms for reciprocal substantially rectilinear motion in side-by-side substantially co-planar relation, for movement between a first position in which said arms are spaced apart between said work stations with said work holding means of said first arm within said first press and said work holding means of said second arm within said second press, and a second position in which said holding means of said first and second arms are in substantially side-by-side co-planar relation,
(f) means for indicating the presence of a work-piece in said first press,
(g) means for indicating that said first press has operated following insertion of said work-piece therein,
(h) means for indicating the absence of a work-piece in said second press,
(i) means for indicating the open condition of said second press,
(j) automatic means for moving said arms from said first position to said second position to simultaneously remove a work-piece from said first press and insert a work-piece in said second press,
(k) and means for preventing the operation of said arms in response to predetermined condition of at least one of said indicating means.

13. Material transferring apparatus comprising:
(a) a support,
(b) at least one pair of pick-up arm assemblies movably supported on said support,
(c) means carried by said support for guiding said arm assemblies for reciprocal substantially rectilinear movement toward and away from each other simultaneously,
(d) each of said arm assemblies comprising a vertically extending portion having upper and lower ends, said upper end being movably supported on said support, and a horizontally extending portion having one end thereof connected to said lower end of said vertically extending portion, and said horizontally extending portion being vertically movable with respect to said vertically extending portion,
(e) material holding means carried by the other end of said horizontally extending portions,
(f) means carried by said support for guiding said arm assemblies for reciprocal substantially rectilinear movement toward and away from each other along a predetermined path of movement.

References Cited by the Examiner
UNITED STATES PATENTS

| | | | |
|---|---|---|---|
| 1,736,340 | 11/29 | Cross | 271—28 |
| 2,060,800 | 11/36 | Ehrig | 271—28 |
| 2,294,273 | 8/42 | Buxbaum. | |
| 2,819,805 | 1/58 | Vieth. | |

FOREIGN PATENTS

| | | |
|---|---|---|
| 31,547 | 10/61 | Finland. |
| 677,284 | 8/52 | Great Britain. |

HUGO O. SCHULZ, *Primary Examiner.*